(12) United States Patent
Azizoglu et al.

(10) Patent No.: US 6,430,201 B1
(45) Date of Patent: Aug. 6, 2002

(54) METHOD AND APPARATUS FOR TRANSPORTING GIGABIT ETHERNET AND FIBER CHANNEL SIGNALS IN WAVELENGTH-DIVISION MULTIPLEXED SYSTEMS

(75) Inventors: Murat Azizoglu, North Billercia; Thomas Kong, Brookline; Eric A. Swanson, Acton, all of MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/468,192

(22) Filed: Dec. 21, 1999

(51) Int. Cl.[7] .................................................. H04J 3/04
(52) U.S. Cl. ...................................................... 370/535
(58) Field of Search ................................ 370/535, 537, 370/522, 401, 389, 395, 474, 351, 352, 354, 445, 447, 465, 466, 338, 332, 333, 442; 380/23, 9, 10, 20, 25; 375/246, 253, 361, 145; 359/135, 136, 139, 147

(56) References Cited

U.S. PATENT DOCUMENTS 5,029,333 A * 7/1991 Graves et al. ............... 370/490
5,425,101 A * 6/1995 Woo et al. ................... 370/409
5,757,416 A * 5/1998 Birch et al. .................. 370/474

OTHER PUBLICATIONS

Simpson, W., "PPP over SONET/SDH" Network Working Group Requests for Comments No.: 1619 May 1994.
Simpson , W., "PPP in ADLC–like Framing" Network Working Group Requests for Comments No.: 1662 Jul. 1994.

* cited by examiner

*Primary Examiner*—Dang Ton
(74) *Attorney, Agent, or Firm*—Weingarten, Schurgin, Gagnebin & Lebovici LLP (57) ABSTRACT

Multiple gigabit Ethernet (GbE) and Fiber Channel (FC) signals are multiplexed and transported on a wavelength-division multiplexed (WDM) communications link using synchronous optical network (SONET) signaling. A transmitter decodes the 8b/10b encoded GbE/FC signals to reduce their respective signaling rates to no greater than the payload data rate of an OC-48 signal used on the link. The decoded signal are packetized into fixed-size packets in order to append a stream identifier used for de-multiplexing at the receive end. The packetized streams are multiplexed together and formatted into the OC-48 signal, which is transmitted over the communications link. A receiver de-multiplexes the received signal to obtain the packet streams, converts the packet streams to the corresponding decoded signals, and re-encodes each signal to re-create the original GbE/FC signals. A pair of interfaces can be arranged to provide independent adding or dropping of the GbE/FC signals that share the same wavelength.

21 Claims, 7 Drawing Sheets

METHOD AND APPARATUS FOR TRANSPORTING GIGABIT ETHERNET AND FIBER CHANNEL SIGNALS IN WAVELENGTH-DIVISION MULTIPLEXED SYSTEMS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to the transport of packet traffic in optical communications networks employing synchronous signaling techniques, such as networks employing the Synchronous Optical Network (SONET) signaling format.

There exist today a large number of wavelength-division multiplexed (WDM) point-to-point transmission systems and WDM networks. Many of these systems have been designed to support a fixed number of wavelengths and a predetermined data format. SONET is a common framing format for data transport in long-haul and metropolitan-area WDM carrier networks. The SONET frame provides a convenient standard mechanism to multiplex and transport circuit-switched traffic in high-speed backbones. There are a number of readily-available standard components for SONET-based systems, such as clock recovery units designed for SONET rates, SONET framers and multiplexers, so that the task of network design is simplified. SONET also provides mechanisms to support network functions such as error detection, alarm insertion, automatic protection switching, etc. The common frame format also allows for advanced functions, such as electro-optic switching, signal regeneration, internal signaling, and signal restoration, that are independent of the format of the native traffic carried by the network. Because of these and other beneficial characteristics, SONET framing is used in most WDM systems deployed today.

In contrast, many packet-switched local area networks (LANs) use framing defined in the long-established Ethernet standard. Unlike SONET, Ethernet and other LAN protocols rely on non-synchronous signaling techniques. While the original Ethernet standard contemplated the use of copper coaxial cable as a physical transmission medium, there have been recent extensions, such as Gigabit Ethernet (GbE), that contemplate the use of optical media. GbE is an evolution of the Ethernet LAN standard to gigabit rates. It uses the same frame format specified by the original Ethernet standard, and the same multiple-access protocol and flow-control methods as the 10 Mb/s and 100 Mb/s Ethernet standards. GbE also employs the same variable frame length (64-1514 byte packets) specified in the Ethernet and Fast Ethernet standards. This backward compatibility makes it easier to connect existing lower-speed Ethernet devices to GbE devices using LAN switches and routers for speed adaptation.

The GbE standard defines both the physical (PHY) and the medium access control (MAC) layers of the OSI architecture. The PHY layer deals with the transmission of bits over physical channels. In particular, the GbE standard specifies a raw bit rate of 1.25 Gb/s. In full-duplex mode, GbE employs a packet switch at the network hub that operates without any collisions. While operating in half-duplex mode, GbE uses the classical CSMA/CD mechanism to resolve contentions for access to the shared physical transmission medium, although the slot duration has been extended over that of Ethernet and Fast Ethernet to allow transmitters sufficient time for collision detection.

Many of the PHY layer features of GbE also appear in another standard called Fiber Channel (FC), which is a protocol for point-to-point high-speed computer interconnection. The FC protocol precedes GbE by several years and has become very popular in practice. FC defines a PHY layer protocol for the point-to-point interconnection of two nodes at a rate of 1.0625 Gb/s.

The FC standard specifies a line encoding algorithm known as "8b/10b" encoding to achieve DC balance and "run length limiting", i.e., providing a minimum rate of signaling transitions in the data stream to ensure adequate clock recovery at a receiver. The 8b/10b code converts a byte-wide data stream of random '0's and '1's into a DC-balanced binary stream with a maximum run length of five '1's or five '0's. This is accomplished by converting 8-bit blocks of the non-encoded data stream into 10-bit code words selected to achieve the run-length limitation. The encoding and decoding algorithms can be readily implemented. At the encoder, two different sub-codes operate on 5-bit and 3-bit sub-blocks of each input block to yield corresponding 6-bit and 4-bit sub-codewords, with minimal interaction between the 5b/6b and the 3b/4b sub-codewords. The code constrains the disparity between the number of '1's and '0's in a sub-block to be −2, 0, or +2. Furthermore, by assigning two sequences to certain inputs, and by switching between these two sequences according to the state of the encoder, the encoder limits the running disparity observed at sub-block boundaries to +1, 0, or −1. Thus, the 8b/10b code provides a mechanism for efficient clock recovery and DC balance, albeit at the expense of a 25% increase in the raw signaling rate of the channel.

Because SONET and GbE have been separately optimized for transport and data networking, respectively, the existing art has treated these signaling mechanisms in an isolated manner. Thus, a typical WDM network with OC-48 interfaces (a particular type of SONET signal) can accept only SONET-framed traffic at the OC-48 rate (2.488 Gb/s); there is no ready mechanism for accepting variable-sized packets transmitted at a non-SONET rate, such as the 1.25 Gb/s rate of a GbE network. While it is possible to use a device known as a "SONET framer" to translate a GbE signal into an OC-48 SONET signal, this approach would result in poor utilization (about 40%) of the available bandwidth at each wavelength transporting such traffic.

An alternative optical transport strategy is to use a so-called "transparent interface", which foregoes SONET framing and performs a simple frequency translation at the optical network boundary. The advantage of this approach is bit rate and format independence. However, this approach suffers from drawbacks such as the lack of performance monitoring within the optical network; the inability to perform opto-electronic circuit switching; and increased jitter accumulation in regenerator cascades.

There is a need for an optical network interface that can accept and multiplex multiple GbE/FC signals into a synchronous format signal such as a SONET signal, in order to provide for multiplexing, adding/dropping, and monitoring LAN traffic in an optical backbone.

BRIEF SUMMARY OF THE INVENTION

In accordance with the present invention, methods and apparatus are disclosed to perform multiplexing and transport of Gigabit Ethernet (GbE) and Fiber Channel (FC) signals on WDM networks using SONET signaling. A line interface in an optical communications node is described that accepts multiple GbE/FC streams, processes these individual streams to reduce their data rates, and combines the rate-matched stream into a standard-rate SONET stream which will be transported on a wave. The data-carrying capacity of the SONET network is efficiently utilized, and important functionality such as synchronization and performance monitoring available in SONET systems is provided.

A transmitter decodes encoded data signals such as GbE or FC signals to generate a corresponding plurality of non-encoded data signals, so that the sum of the respective signaling rates of the non-encoded data signals is no greater than the data-carrying capacity of the communications link. In one embodiment this decoding reduces the signaling rate of each signal to about 9/10 the signaling rate of the encoded signal. The non-encoded data signals are multiplexed together to form a multiplexed data signal, the multiplexed data signal is transmitted over the communications link. In one embodiment the multiplexed signal is an OC-48 or similar synchronous transport signal. A receiver receives the multiplexed data signal from the communications link, de-multiplexes the received signal to obtain the non-encoded data signals, and re-encodes each de-multiplexed data signal to re-create the encoded data signals at the receive end.

To enable correct de-multiplexing at the receive end, the disclosed system employs packetization of the signals after decoding, where each packet includes an address or stream identifier. The transmitter converts sequential data blocks of each non-encoded signal into corresponding packets, and asynchronously interleaves the packets of the non-encoded signals to create the multiplexed data signal. The packets may be of a fixed size, which is chosen to achieve a desired balance between link bandwidth efficiency and storage efficiency. In one embodiment a 67 byte packet size is used. The receiver uses the stream identifier of the packets to separate the streams for the different signals, and then re-encodes each signal to re-create the encoded signals at the receive end.

The stripping of coding overhead at a transmitter and re-encoding at the receiver advantageously permits multiple signals, such as multiple GbE or FC signals, to be carried on a single transport signal such as an OC-48 signal. All the advantages of SONET transport, such as error monitoring, flexible add/drop, etc., can be realized for the GbE or FC traffic. Moreover, because SONET includes a mechanism for maintaining synchronization, accurate end-to-end operation is obtained despite the removal of the timing information embedded from the encoded data signals before transport over the communications link.

Other aspects, features, and advantages of the present invention are disclosed in the detailed description that follows.

DETAILED DESCRIPTION OF THE INVENTION

Figure 1:
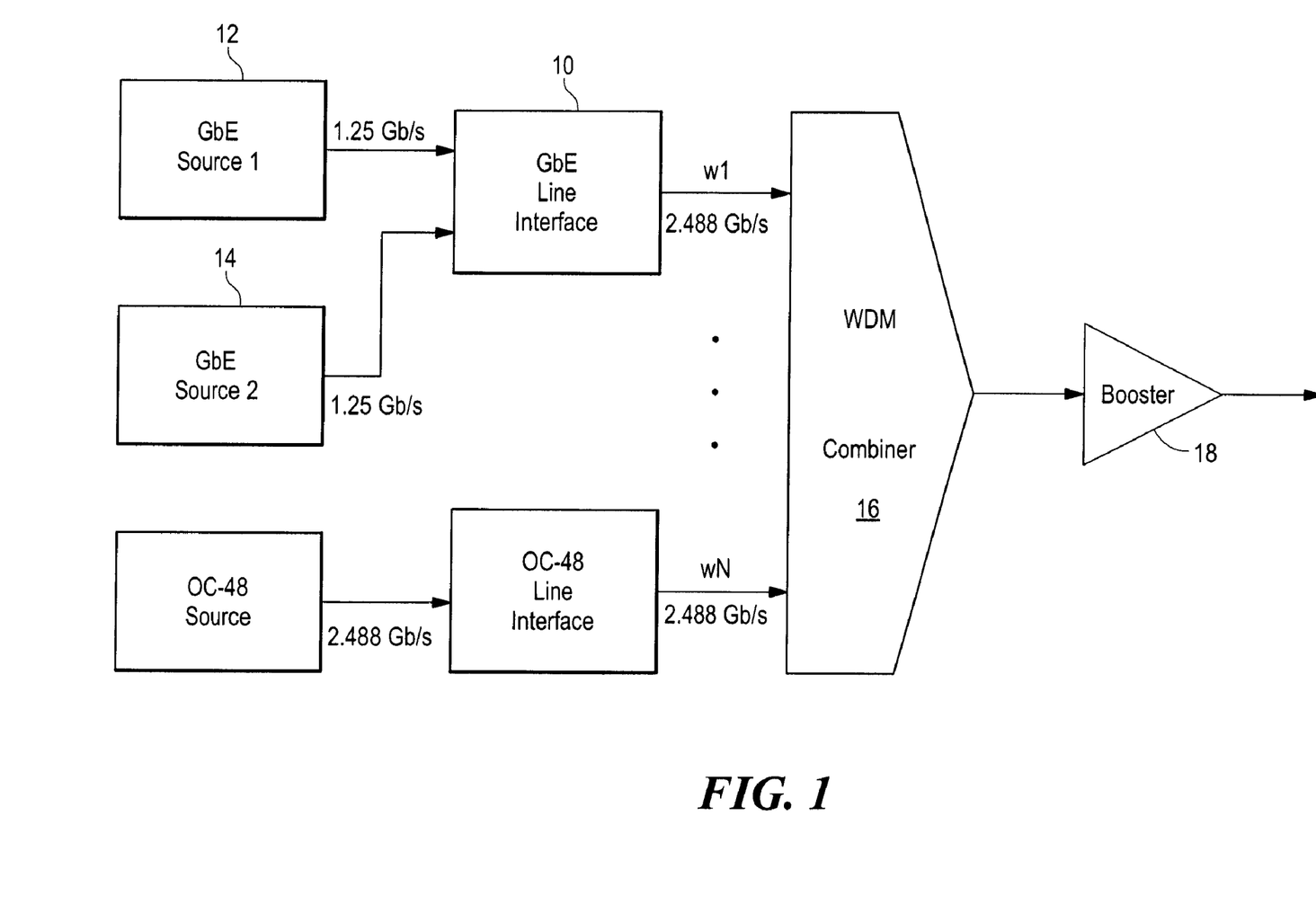
FIG. 1 is a block diagram of the transmit side of a wavelength-division multiplexed (WDM) optical communications node in accordance with the present invention.

FIG. 1 shows an example of a transmitter node in a wavelength-division multiplexed (WDM) system. The WDM node includes a GbE line interface 10 that multiplexes two GbE signals received from respective GbE sources 12, 14 onto a single optical signal having wavelength w1. As shown, signals from other sources are mapped into other wavelengths w2 . . . wN. The line interface 10 converts the input signals into a SONET signal (OC-48 in this example), which is used to modulate an optical carrier of wavelength w1, which in the illustrated embodiment is in the range of 1530–1605 nm. The different wavelengths are combined using a WDM combiner 16. The output of the combiner 16 is sent to a booster amplifier 18, and the amplified WDM signal is supplied to a fiber (not shown) for transmission to a remote node. The transmitted signal typically travels through a series of transmission spans, each terminated by an optical amplifier.

There is a fundamental mismatch between the 1.25 Gb/s signaling rate of a GbE signal and the 2.488 Gb/s capacity of an OC-48-formatted wave. If an OC-48 wave were populated by only a single GbE, slightly less than half the wave capacity is wasted. However, an OC-48 wave has insufficient capacity to carry two such GbE signals. In the illustrated system, however, a technique is used that enables one OC-48 wave to carry two GbE or FC signals.

Figure 2:
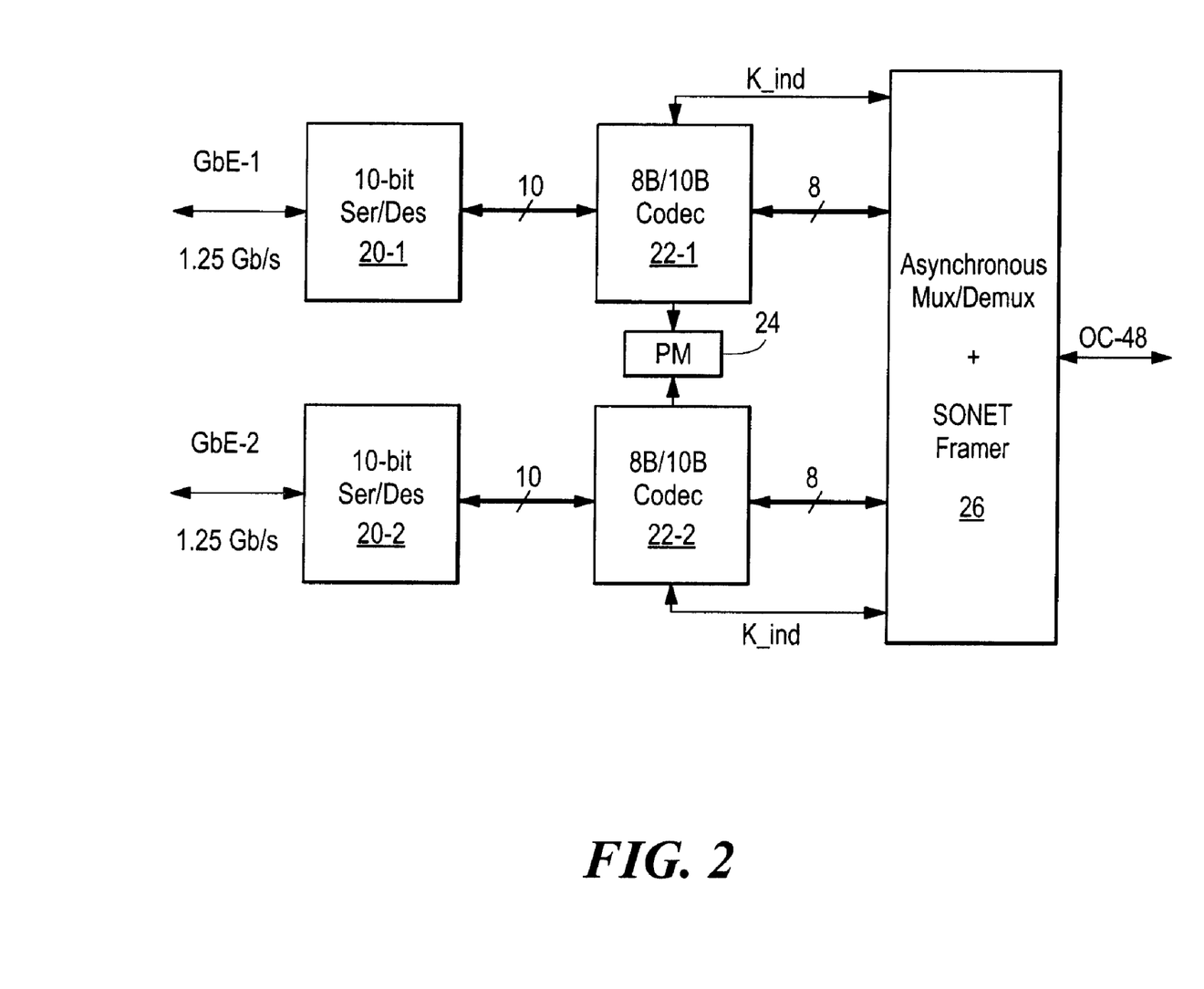
FIG. 2 is a high-level block diagram of the transmit side of a high-speed line interface in the WDM optical communications node of FIG. 1.

A multiplexing method for combining two GbE signals into an OC-48 wavelength is shown in FIG. 2. Each of the two GbE inputs is first converted into a 10-bit parallel stream by a corresponding serializer/deserializer (Ser/Des) 20-1 or 20-2. The 10-bit parallel streams are then decoded by 8b/10b codecs 22-1 and 22-2, which remove the run-length code overhead from each stream. Each codec 22-1 and 22-2 provides error information to performance monitoring (PM) logic 24 which monitors the bit error rate (BER) performance of the GbE signals. The output of each codec 22-1 and 22-2 is an 8-bit parallel stream at a bit rate of 1 Gb/s. A ninth bit is added to indicate whether a byte has originated from a special type of character called a "K-character" used in GbE systems. GbE employs these K-characters for the exchange of control information, such as the indication of start and end of a packet, idle channel status, etc. Since all 256 8-bit characters occur within the data, a ninth bit is necessary to indicate the presence of a K-character. As a result, the aggregate rate at the output of the two 8b/10b codecs 22-1 and 22-2 is 2.25 Gb/s. The rate-reduced streams are supplied to multiplexing and framing logic 26, which multiplexes the streams together using an asynchronous statistical multiplexing technique described below, and maps the multiplexed streams into synchronous frames in the OC-48 signal.

Figure 3:
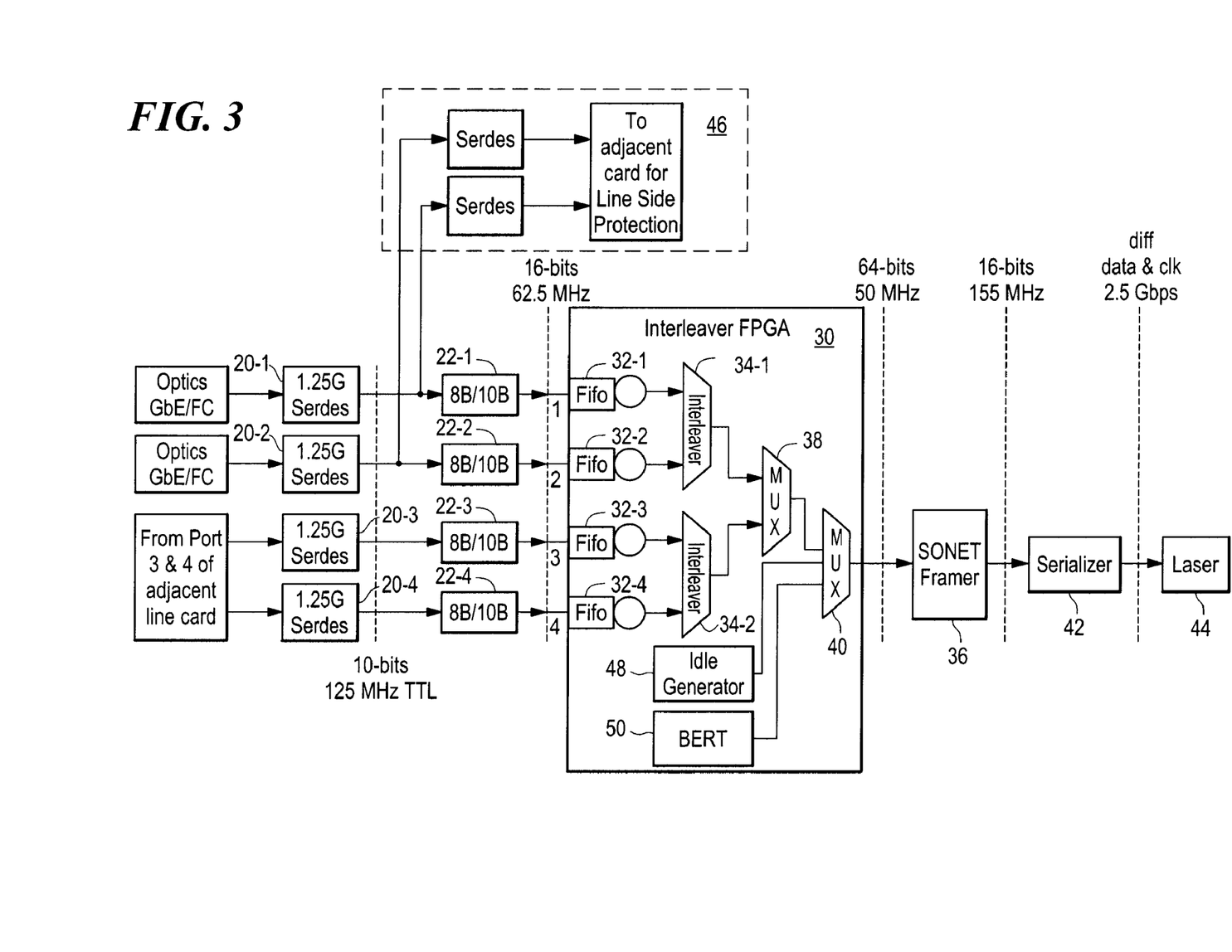
FIG. 3 is a more detailed block diagram of the transmit side of the line interface shown in FIG. 2.

An implementation of the transmitter is shown in more detail in FIG. 3. An interleaver 30 is shown that can be implemented using a field programmable gate array (FPGA). The data bytes from the 8b/10b codecs 22-1 and 22-2 are stored in FIFO buffers 32-1, 32-2, 32-3, and 33-4 in the interleaver FPGA 30. Interleaving logic 34-1 packetizes the data streams from the FIFO buffers 32-1 and 32-2 into fixed-size packets, and interleaves the streams using statistical multiplexing. This function is also performed by interleaving logic 34-2 for separate data streams, as described below. If both FIFO buffers 32-1 and 32-2 are non-empty, packets are selected in an alternating manner from the FIFO buffers 32-1 and 32-2 and sent successively to a SONET framer device 36 via multiplexers 38 and 40. If one of the FIFO buffers 32-1 or 32-2 is empty while the other is non-empty, then the interleaving logic 34-1 pulls multiple packets from the non-empty FIFO buffer for successive insertion into the OC-48 stream, thus making full use of available transmit bandwidth. As shown, the output of the SONET framer 36 is a 16-bit parallel signal, which is converted by a serializer 42 into a serial OC-48 signal used to modulate a laser 44.

The statistical time division multiplexing (TDM) technique requires the use of a stream identifier in each transmitted packet to enable proper de-multiplexing at the receiving end. A framing byte (or multiple bytes) is also needed. Both the stream identifier and framing bytes represent overhead that consumes bandwidth. The size of the packet is selected to achieve a suitable compromise between bandwidth efficiency (which tends to increase with greater packet size for a given amount of overhead) and storage efficiency (which tends to decrease with packet size for a given average GbE frame size). Bandwidth efficiency is important when there is only a small margin between the aggregate data rate of the signals being combined (e.g., two GbE signals) and the payload data rate of the carrier signal (e.g., the OC-48 signal). Storage efficiency is important in applications having bursty traffic patterns, such as a GbE LAN. If the packets are too large, latency in the FIFO buffers 32-1, 32-2, 33-3, and 32-4 is undesirably large. In the illustrated embodiment, a 67-byte packet is used to achieve the desired balance between bandwidth and storage efficiency. The packet has a 64-byte payload, a 1-byte address or stream identifier, a 1-byte header flag and a 1-byte trailer flag. The resulting bandwidth expansion keeps the aggregate bit rate below that of the OC-48 payload rate while minimizing the storage required in the FPGA 30.

FIG. 3 also shows how line-side protection capability can be supported by the GbE line interface 10, either in a "1+1" mode or in a "1:1" mode. At the transmitting node, the two GbE signals are sent via an electrical interface 46 to a neighboring line interface card (not shown) which operates at the same wavelength, but in the opposite direction on the ring. Similarly, the neighboring card forwards its two GbE signals to the line interface card 10. Thus, the transmitter side of the line interface card 10 has four GbE inputs: inputs 1 and 2 via respective 1310 nm optical interfaces (or any other suitable physical interface), and inputs 3 and 4 via respective electrical connections from the neighboring line interface card. In 1+1 protection mode, either the input pair (1,2) are active or the input pair (3,4) are active, depending on whether the line interface card 10 is part of the working path or the protection path. The active pair is selected by the multiplexer 38. In 1:1 protection mode, all four input ports are active. Under normal operation, GbE signals from input ports 3 and 4 are simply terminated at the interleaver FPGA 30. When a failure occurs, the multiplexer 38 selects the signals from ports 3 and 4 and terminates the signals from ports 1 and 2.

As shown in FIG. 3, the interleaver FPGA 30 also contains an idle generator 48 and a bit error rate tester (BERT) 50 that are used for testing and monitoring purposes. The multiplexer 40 is used to select from among the normal data stream or the respective outputs of these devices.

Figure 4:
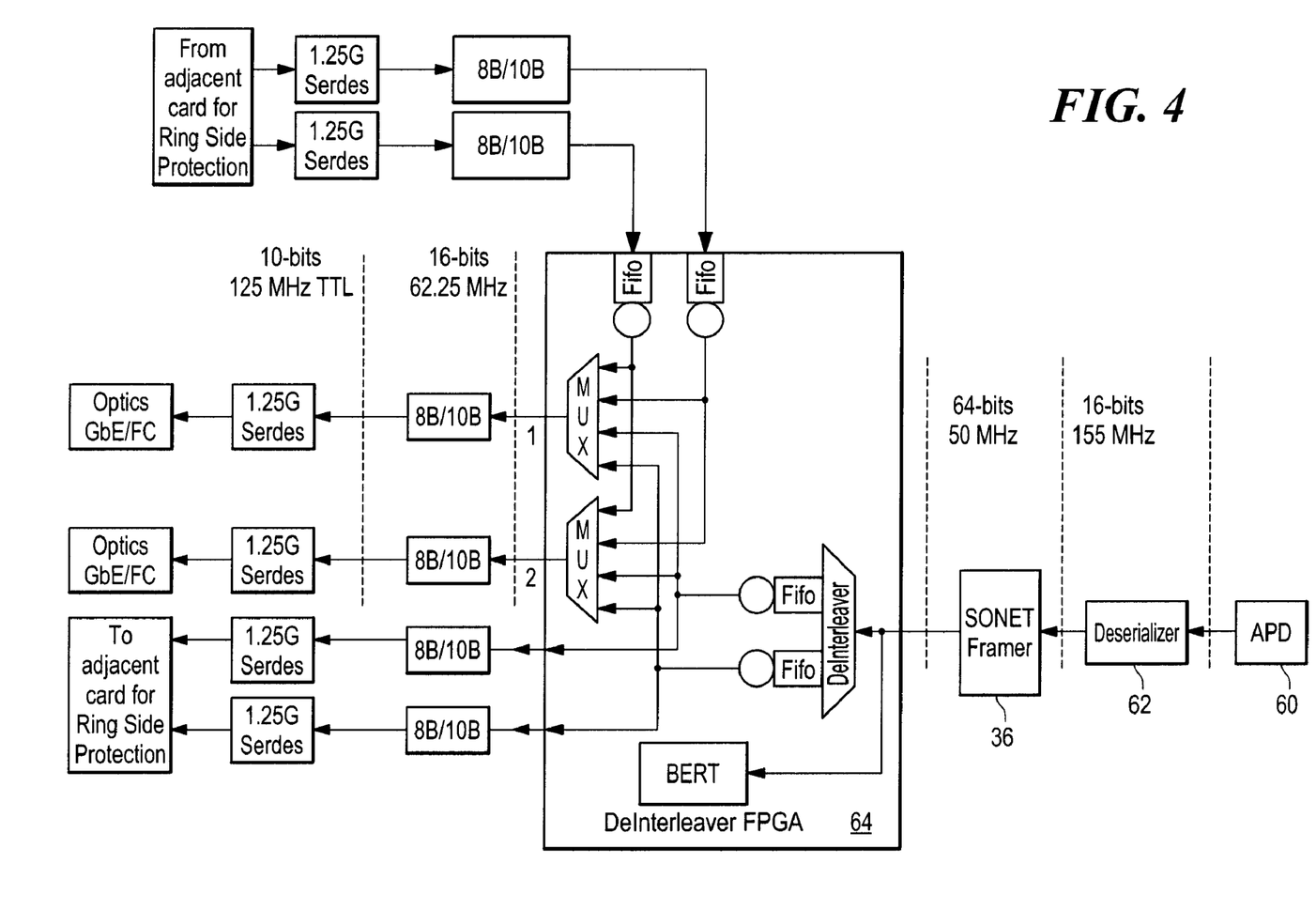
FIG. 4 is a detailed block diagram of the receive side of a high-speed line interface in the WDM optical communications node of FIG. 1.

FIG. 4 shows a functional block diagram of the receive side of the GbE line interface 10. The output from the avalanche photo-diode (APD) 60 is supplied to a de-serializer 62. The output of the de-serializer 62 is provided to the SONET framer 36, which removes SONET overhead and carries out performance monitoring functions. A de-interleaver FPGA 64 separates packets belonging to different streams using the address byte in the packet headers. After the appropriate stream from the working or protection side is chosen, the 8b/10b codecs 22-1 and 22-2 re-insert the run-length code. Thus, from an input/output perspective, the removal of the run-length coding for WDM transport is invisible to the GbE or FC devices that send and receive the GbE/FC signal carried over the WDM optical link.

The method described here is also applicable when one of the inputs is a Gbe signal and the other is a FC signal. Since the two inputs operate on separate clocks, the appropriate clock rates (one at 1.25 GHz and one at 1.0625 GHz) enable the operation with hybrid GbE/FC inputs without any modifications to the transmitter/receiver hardware.

Figure 5:
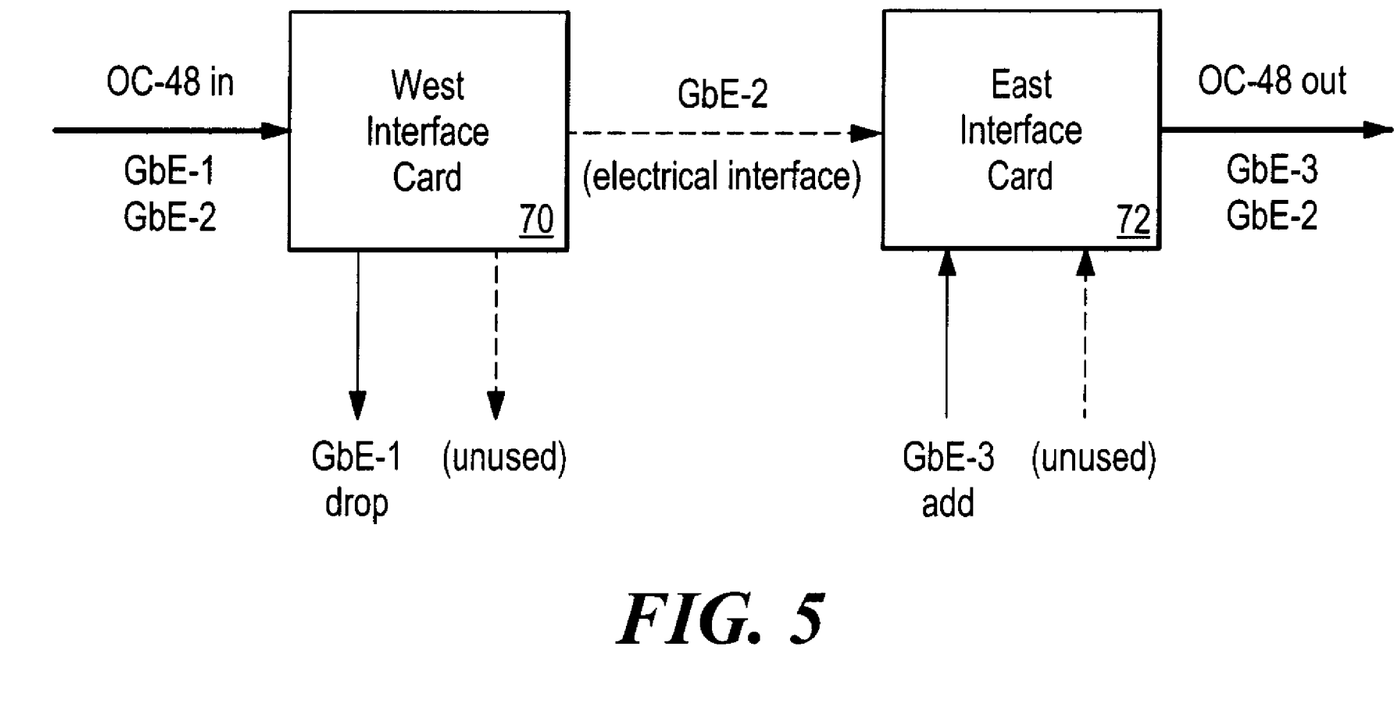
FIG. 5 is a block diagram showing an interconnection among two line interfaces such as shown in FIGS. 3 and 4.

It will be appreciated that between a neighboring pair of line interface cards, four pairs of signals are routed: two pair of GbE/FC signals (ports 1,2 and ports 3,4) for the transmit side, and two pair of GbE/FC signals (ports 1,2 and ports 3,4) for the receive side. This configuration enables the independent adding and dropping of one of a pair of GbE signals that use the same wavelength. An example is shown in FIG. 5. A "west" interface 70 receives an OC-48 signal carrying two GbE signals, which are referred to as GbE-1 and GbE-2. As shown, the GbE-1 signal is dropped locally, and the GbE-2 signal is forwarded via the electrical interface card to an "east" interface 72. The east interface 72 adds a new GbE signal, referred to as GbE-3, onto the same wave. The OC-48 signal emerging from the east interface 72 includes the signals GbE-2 and GbE-3, as shown. FIG. 5 shows the paths for the eastbound signals only. It will be clear that an analogous arrangement can simultaneously be obtained for the westbound signals, so that the westbound GbE-3 is dropped by interface card 72 and the westbound GbE-1 is added by the interface card 70. This functionality is achieved through the electrical connection between adjacent cards, as indicated in FIGS. 3 and 4.

Figure 6:
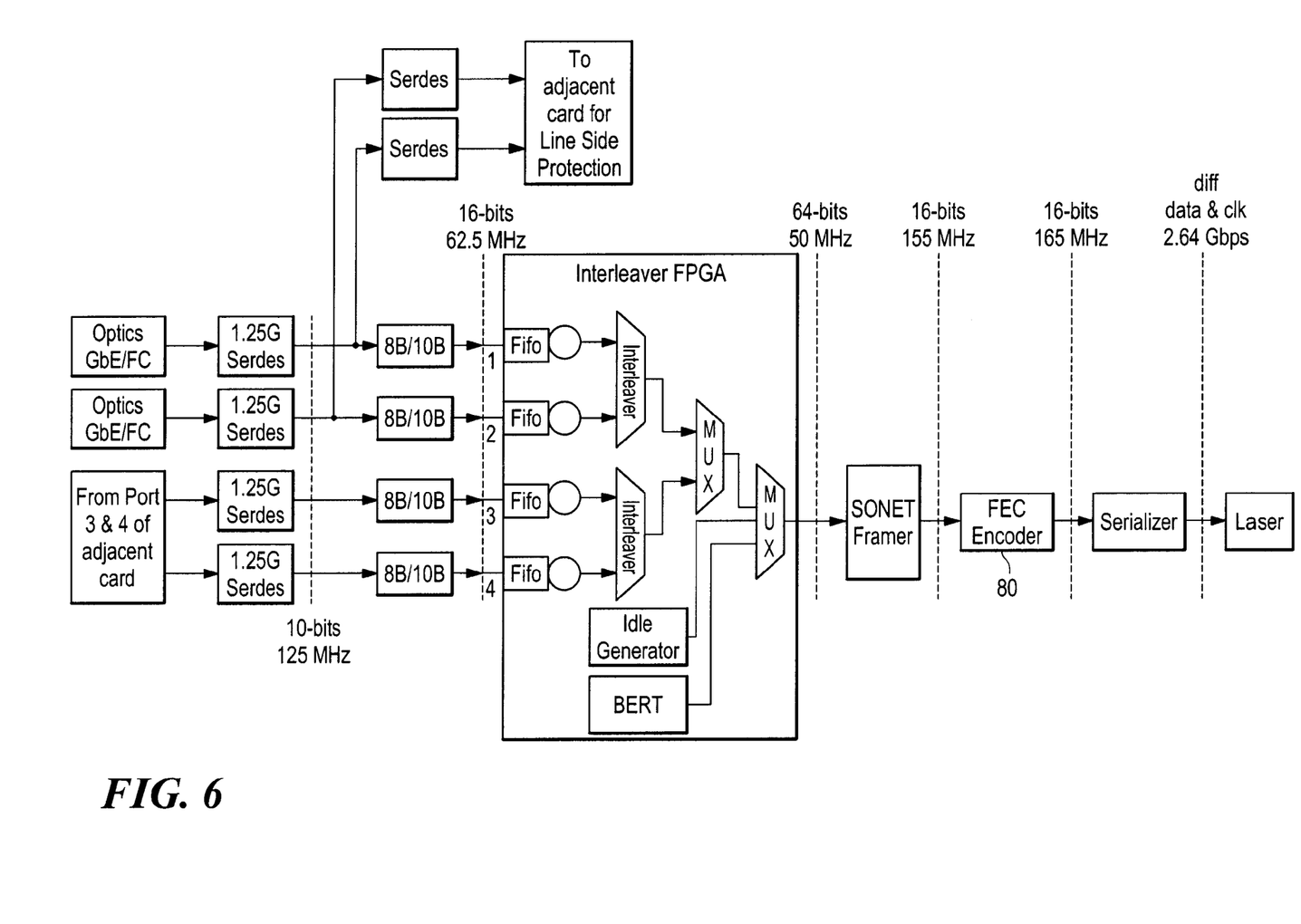
FIG. 6 is a block diagram of the transmit side of a high-speed line interface similar to that of FIG. 3 using forward-error-correction (FEC) encoding.
Figure 7:
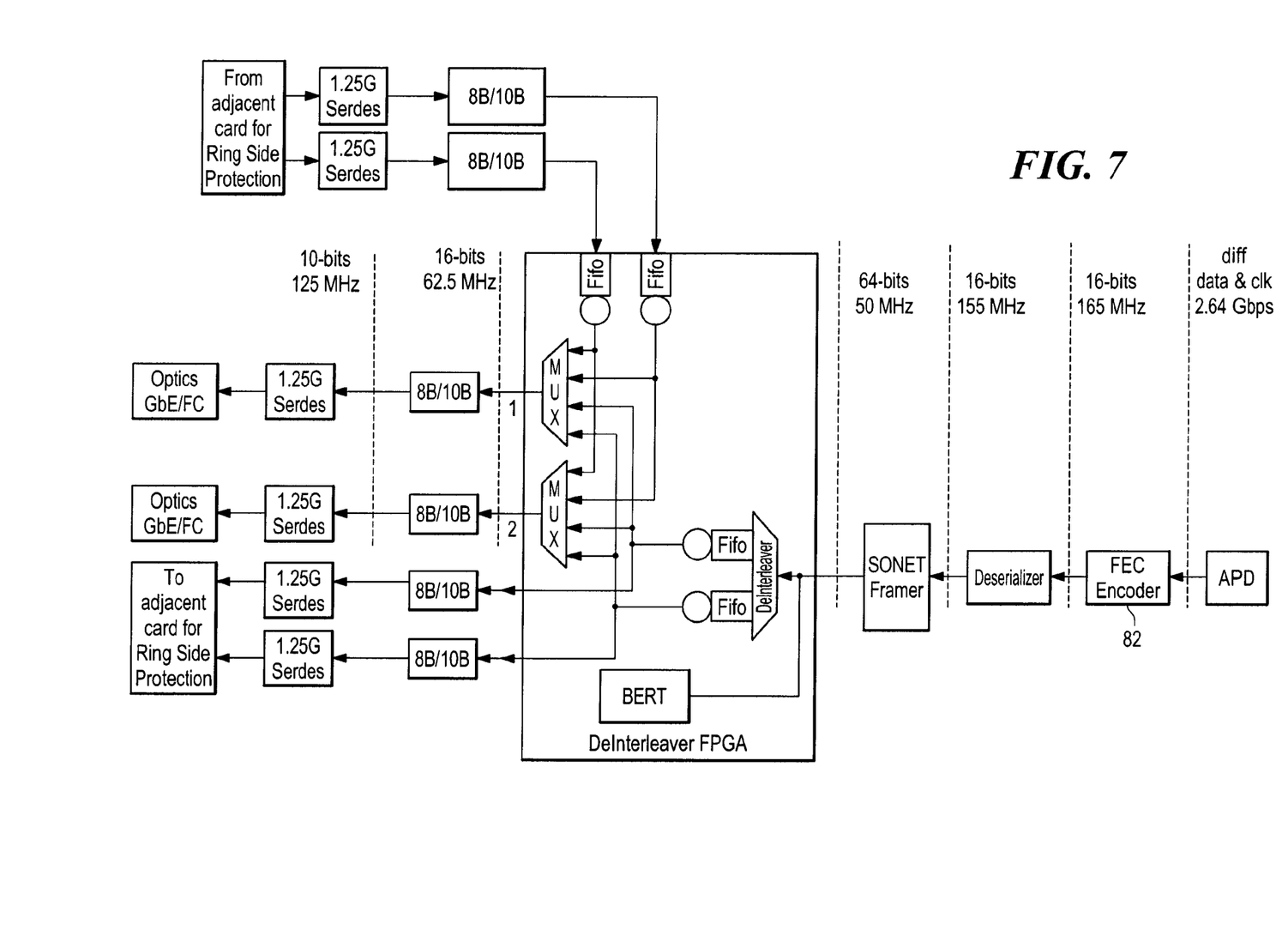
FIG. 7 is a block diagram of the receive side of a high-speed line interface similar to that of FIG. 4 using forward-error-correction (FEC) encoding.

FIGS. 6 and 7 illustrate a transmitter and receiver, respectively, that use forward error correction (FEC) coding to improve the bit error rate (BER) performance of the GbE streams. A FEC encoder 80 and matching FEC decoder 82, operating at the OC-48 rate, protect the GbE traffic against channel degradations, such as amplifier spontaneous emission (ASE) noise, receiver thermal noise, fiber non-linearities, linear dispersion, etc.

Methods and apparatus for transporting GbE and FC signals in WDM systems have been described. It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of transporting a plurality of encoded data signals over a communications link having a data-carrying capacity less than the sum of the respective signaling rates of the encoded data signals, comprising:

at a transmitter coupled to the link, (i) decoding the encoded data signals to generate a corresponding plurality of non-encoded data signals, the sum of the respective signaling rates of the non-encoded data signals being no more than the data-carrying capacity of the link, (ii) multiplexing the non-encoded data signals together to form a multiplexed data signal, and (iii) transmitting the multiplexed data signal over the communications link; and at a receiver coupled to the link, (i) receiving the multiplexed data signal transmitted by the transmitter, (ii) de-multiplexing the received signal to obtain the non-encoded data signals, and (iii) re-encoding each de-multiplexed data signal to re-create the encoded data signals.

2. A method according to claim 1, wherein the encoded data signals are gigabit Ethernet signals encoded with an 8b/10b encoding.

3. A method according to claim 1, wherein the encoded data signals are gigabit Ethernet signals each encoded with an 8b/10b encoding, and wherein the multiplexed data signal is an optical carrier signal.

4. A method according to claim 3, wherein the number of gigabit Ethernet streams is two, and the optical carrier signal is an optical carrier 48 (OC-48) signal.

5. A method according to claim 3, wherein the number of gigabit Ethernet streams is eight, and the optical carrier signal is an optical carrier 192 (OC-192) signal.

6. A method according to claim 1, further comprising:

at the transmitter, converting sequential data blocks of each non-encoded signal into corresponding packets, and asynchronously interleaving the packets of the non-encoded signals to create the multiplexed data signal; and at the receiver, de-interleaving the packets of the received multiplexed data signal to create corresponding sequential streams of packets, and converting the sequential packets of each stream into the corresponding non-encoded data signal.

7. A method according to claim 6, wherein the packets are of a fixed size.

8. A method according to claim 1, wherein the encoded data signals are gigabit Ethernet signals encoded with an 8b/10b encoding, and wherein the multiplexed data signal is an optical carrier 48 (OC-48) signal, and further comprising:

at the transmitter, converting sequential data blocks of each non-encoded signal into corresponding fixed-size packets, and asynchronously interleaving the packets of the non-encoded signals to create the OC-48 signal; and at the receiver, de-interleaving the packets of the received multiplexed data signal to create corresponding sequential streams of packets, and converting the sequential packets of each stream into the corresponding non-encoded data signal.

9. A method according to claim 1, wherein the encoded data signals are encoded according to a run-length limited code.

10. A method according to claim 1, wherein the communications link employs error control coding to detect the occurrence of errors in the multiplexed data signal.

11. A method according to claim 1, further comprising:

at the transmitter, performing forward error correction (FEC) coding of the multiplexed data signal prior to its transmission over the communications link; and at the receiver, performing FEC decoding of the received multiplexed data signal.

12. An interface in a network device, comprising:

transmitter circuitry operative to (i) receive a plurality of encoded data signals for transmission over a communications link having a data-carrying capacity less than the sum of the respective signaling rates of the encoded data signals, (ii) decode the encoded data signals to generate a corresponding plurality of non-encoded data signals, the sum of the respective signaling rates of the non-encoded data signals being no more than the data-carrying capacity of the communications link, (iii) multiplex the non-encoded data signals together to form a multiplexed data signal, and (iv) transmit the multiplexed data signal over the communications link; and receive circuitry operative to (i) receive a multiplexed data signal from the communications link, the multiplexed data signal including a plurality of data signals multiplexed together, each data signal having been generated by decoding a corresponding encoded data signal, (ii) de-multiplex the received signal to obtain the plurality of data signals, and (iii) encode each de-multiplexed data signal to re-create the encoded data signals.

13. An interface according to claim 12, wherein the encoded data signals are gigabit Ethernet signals encoded with an 8b/10b encoding.

14. An interface according to claim 12, wherein the encoded data signals are gigabit Ethernet signals encoded with an 8b/10b encoding, and wherein the multiplexed data signal is an optical carrier 48 (OC-48) signal.

15. An interface according to claim 12, wherein:

the transmit circuitry is further operative to convert sequential data blocks of each non-encoded signal into corresponding packets, and asynchronously interleave the packets of the non-encoded signals to create the multiplexed data signal; and the receive circuitry is further operative to de-interleave the packets of the received multiplexed data signal to create corresponding sequential streams of packets, and convert the sequential packets of each stream into the corresponding non-encoded data signal.

16. An interface according to claim 15, wherein the packets are of a fixed size.

17. An interface according to claim 12, wherein the encoded data signals are gigabit Ethernet signals encoded with an 8b/10b encoding, and wherein the multiplexed data signal is an optical carrier 48 (OC-48) signal, and wherein:

the transmit circuitry is further operative to convert sequential data blocks of each non-encoded signal into corresponding fixed-size packets, and asynchronously interleave the packets of the non-encoded signals to create the OC-48 signal; and the receive circuitry is further operative to de-interleave the packets of the received multiplexed data signal to create corresponding sequential streams of packets, and convert the sequential packets of each stream into the corresponding non-encoded data signal.

18. An interface according to claim 12, wherein the encoded data signals are encoded according to a run-length limited code.

19. An interface according to claim 12, wherein the communications link employs error control coding to detect the occurrence of errors in the multiplexed data signal.

20. An interface according to claim 12, wherein:

the transmit circuitry is further operative to perform forward error correction (FEC) coding of the multiplexed data signal prior to its transmission over the communications link; and the receive circuitry is further operative to perform FEC decoding of the received multiplexed data signal.

21. An interface according to claim 12 forming a first interface in a pair of interfaces, wherein the plurality of encoded data signals received by the transmit circuitry are a first plurality of received encoded data signals and the plurality of encoded signals re-created by the receive circuitry are a first plurality of re-created encoded data signals, and wherein:

the transmit circuitry is further operative to (i) receive a second plurality of encoded data signals from a second interface in the pair of interfaces, (ii) decode each of the second plurality of encoded data signals to generate a corresponding plurality of non-encoded data signals, and (iii) select either the non-encoded data signals generated from the first plurality of encoded data signals or the non-encoded data signals generated from the second plurality of encoded data signals for multiplexing to form the multiplexed data signal; and the receive circuitry is further operative to (i) select either the de-multiplexed data signals or a plurality of data signals received from the second interface for encoding to re-create a second plurality of re-created encoded data signals.

\* \* \* \* \*